(12) United States Patent
Takahashi

(10) Patent No.: US 11,104,337 B2
(45) Date of Patent: Aug. 31, 2021

(54) TRAVEL CONTROL DEVICE, VEHICLE, AND TRAVEL CONTROL METHOD

(71) Applicant: Isuzu Motors Limited, Tokyo (JP)

(72) Inventor: Naoki Takahashi, Chigasaki (JP)

(73) Assignee: Isuzu Motors Limited, Tokyo (JP)

( * ) Notice: Subject to any disclaimer, the term of this patent is extended or adjusted under 35 U.S.C. 154(b) by 10 days.

(21) Appl. No.: 16/496,430

(22) PCT Filed: Mar. 16, 2018

(86) PCT No.: PCT/JP2018/010555
§ 371 (c)(1),
(2) Date: Sep. 22, 2019

(87) PCT Pub. No.: WO2018/173963
PCT Pub. Date: Sep. 27, 2018

(65) Prior Publication Data
US 2020/0023844 A1 Jan. 23, 2020

(30) Foreign Application Priority Data

Mar. 22, 2017 (JP) .............................. JP2017-056555

(51) Int. Cl.
*B60W 30/14* (2006.01)
*B60W 30/18* (2012.01)
*B60W 30/12* (2020.01)

(52) U.S. Cl.
CPC .......... *B60W 30/143* (2013.01); *B60W 30/12* (2013.01); *B60W 30/18072* (2013.01); *B60W 2555/60* (2020.02); *B60W 2720/10* (2013.01)

(58) Field of Classification Search
CPC .................................................... B60W 30/09
See application file for complete search history.

(56) References Cited

U.S. PATENT DOCUMENTS

2018/0105171 A1* 4/2018 Tsuji ..................... B60W 30/14
2019/0283749 A1* 9/2019 Girond ............. G08G 1/096725

FOREIGN PATENT DOCUMENTS

| JP | 2006-200370 | 8/2006 |
|----|-------------|--------|
| JP | 2012-066774 | 4/2012 |

(Continued)

OTHER PUBLICATIONS

International Search Report and the Written Opinion dated May 22, 2018 From the International Searching Authority Re. Application No. PCT/JP2018/010555 and Its Translation of Search Report Into English. (8 Pages).

*Primary Examiner* — Imran K Mustafa

(57) ABSTRACT

Provided are a travel control device, a vehicle, and a travel control method that ensure safety in cases of a possible lane departure. This travel control device is equipped with: a travel control unit that switches between and executes a constant speed travel control for causing a vehicle 1 to travel at a target speed and a coasting control for causing the vehicle to travel by inertia; and a switching control unit that, in cases in which it has been determined by a lane departure warning unit that there is a risk that the vehicle will depart from the travel lane while executing the constant speed travel control or the coasting control, controls the travel control unit to execute the constant speed travel control without executing the coasting control for a prescribed period of time.

11 Claims, 5 Drawing Sheets

(56) References Cited

FOREIGN PATENT DOCUMENTS

| JP | 2013-003913 | 1/2013 |
| JP | 2014-091380 | 5/2014 |
| JP | 2016-118238 | 6/2016 |
| JP | 2017-024479 | 2/2017 |
| WO | WO 2018/173963 | 9/2018 |

\* cited by examiner

TRAVEL CONTROL DEVICE, VEHICLE, AND TRAVEL CONTROL METHOD

RELATED APPLICATIONS

This application is a National Phase of PCT Patent Application No. PCT/JP2018/010555 having International filing date of Mar. 16, 2018, which claims the benefit of priority of Japanese Patent Application No. 2017-056555 filed on Mar. 22, 2017. The contents of the above applications are all incorporated by reference as if fully set forth herein in their entirety.

FIELD AND BACKGROUND OF THE INVENTION

This disclosure relates to a travel control device for controlling the travel of a vehicle, a vehicle, and a travelling control method.

Conventionally, there is known a travel control device which controls the automatic traveling of a vehicle (traveling without requiring the driver's operation).

For example, Patent Literature 1 discloses a travel control device that performs a control (hereinafter referred to as a constant velocity traveling control) in which the vehicle velocity is maintained at a set velocity (hereinafter referred to as the target vehicle velocity) to run the vehicle.

For example, in Patent Literature 2, there is disclosed a travel control device which performs a control for allowing the vehicle to travel by inertia (hereinafter referred to as coasting control) by temporarily stopping an engine and disconnecting a power transmission mechanism provided in a power transmission system between a transmission and the engine or between the transmission and wheels when predetermined conditions are satisfied while the vehicle is traveling.

Further, the lane departure warning system (LDWS) is known as a technology for ensuring the safety of the traveling vehicle in the related art (see, for example, PTL 3). The lane departure warning system detects the lane on the road where the vehicle is traveling, determines whether the vehicle is likely to depart from the lane, and outputs an alarm when there is a risk of departing the lane, and warns the driver of the vehicle.

CITATION LIST

Patent Literature

PTL 1: Japanese Patent Application Laid-Open No. 2017-024479
PTL 2: Japanese Patent Application Laid-Open No. 2006-200370
PTL 3: Japanese Patent Application Laid-Open No. 2013-003913

SUMMARY OF THE INVENTION

Technical Problem

However, in a vehicle capable of switching between constant velocity traveling and coasting, when the lane departure warning system is applied, the following problems are posed because each control logic is different.

For example, even when the lane departure warning system determines that there is a likelihood of lane departure during coasting, the coasting may continue.

Further, for example, even when it is determined that the lane departure warning system determines that there is likelihood of the lane departure during constant velocity traveling, when the coasting starting condition is satisfied, switching from the constant velocity traveling to the coasting is performed.

As described above, if coasting is performed when there is likelihood of lane departure, the brake is not operated, so that it is very dangerous.

An object of this disclosure is to ensure safety in the case where there is a risk of lane departure.

Solution to Problem

A travel control device according to one aspect of the present disclosure includes: a travel control section that switches between a constant velocity traveling control for causing a vehicle to travel at a target vehicle velocity and a coasting control for allowing the vehicle to travel by inertia, and a switching control section that controls the travel control section to execute the constant velocity traveling control without executing the coasting control when the vehicle is likely to depart from a traveling lane under the constant velocity traveling control or the coasting control.

A vehicle according one aspect of the present disclosure includes the travel control device according to the one aspect of the present disclosure.

A travel control method according to one aspect of the present disclosure is a method performed by a travel control device that switches between a constant velocity traveling control for causing a vehicle to travel at a target vehicle velocity and a coasting control for allowing the vehicle to travel by inertia, the method including: executing the constant velocity traveling control without executing the coasting control when the vehicle is likely to depart from the traveling lane under the constant velocity traveling control or the coasting control.

Advantageous Effects of Invention

According to this disclosure, it is possible to ensure safety in the case where there is likelihood of lane departure.

DESCRIPTION OF SPECIFIC EMBODIMENTS OF THE INVENTION

Hereinafter, embodiments of this disclosure will be described in detail with reference to the drawings.

<Example of Configuration of Vehicle 1>

Figure 1:
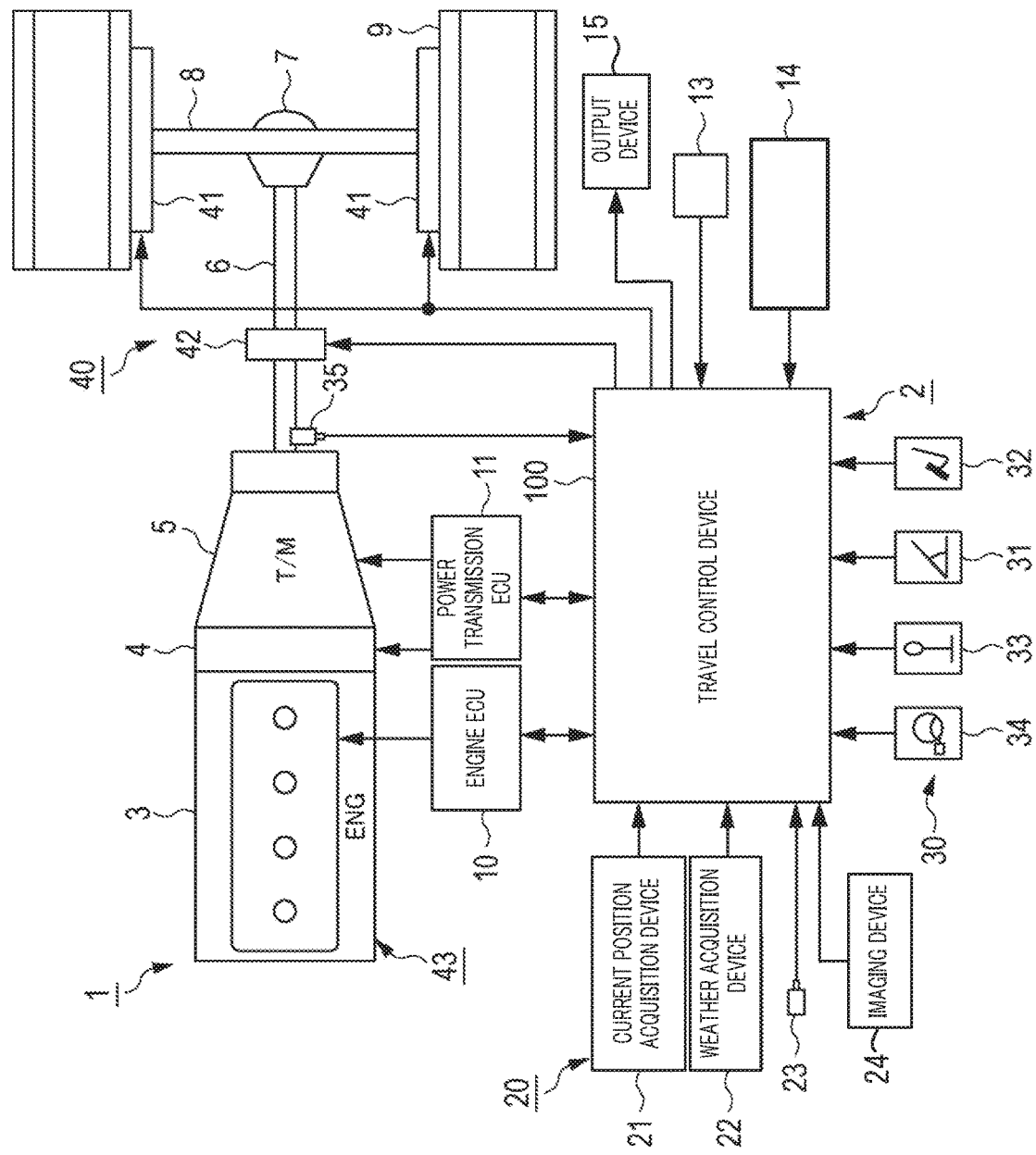
FIG. 1 is a diagram schematically illustrating an example of a configuration of a vehicle including a travel control device according to an embodiment of this disclosure.

First, the configuration of vehicle 1 including travel control device 100 according to the embodiment of this disclosure will be described. FIG. 1 is a block diagram illustrating an example of a configuration of vehicle 1 including travel control device 100 according to the present embodiment. Hereinafter, a description will be given of a portion related to travel control device 100, focusing on the parts associated with travel control device 100.

Vehicle 1 is a vehicle capable of switching between a constant velocity traveling and a coasting. The constant velocity traveling (also referred to as driving travel) is a travel in which vehicle 1 is travelled to drive wheels 9 by a drive system to be described later to maintain the target vehicle velocity (target vehicle velocity V illustrated in FIGS. 3 and 4). The coasting is traveling in which vehicle 1 is driven by using the inertial force without driving wheels 9 by a drive system described later.

In the present embodiment, as an example, a case where coasting is a neutral inertia traveling (hereinafter referred to as "N coasting") in which the gear stage of the transmission is neutral will be described as an example, but the present invention is not limited thereto, and the free-run inertia traveling may also be used. While the N coasting is performed by supplying the fuel to the engine in a state where the clutch in the power transmission path is disengaged and the engine is disconnected from the wheels, the free-run inertia traveling is performed by stopping the supply of fuel to the engine in a state where the clutch in the power transmission path is disengaged and the engine is disconnected from the wheels.

In the following description, control for causing vehicle 1 to execute constant velocity traveling is referred to as "constant velocity traveling control", and control for causing vehicle 1 to execute the N coasting is referred to as "N coasting control".

Vehicle 1 illustrated in FIG. 1 is a large vehicle such as a truck on which a series 6 cylinder diesel engine is mounted, for example.

As illustrated in FIG. 1, vehicle 1 includes engine 3, clutch 4, transmission 5, propulsion shaft (propeller shaft) 6, differential device (differential gear) 7, drive shaft 8, and wheels 9 as a configuration of a drive system for traveling the vehicle.

Power of engine 3 is transmitted to transmission 5 via clutch 4, and the power transmitted to transmission 5 is further transmitted to wheels 9 via propulsion shaft 6, differential device 7, and drive shaft 8. Thus, power of engine 3 is transmitted to wheels 9, and vehicle 1 travels.

Further, vehicle 1 has braking device 40 as a structure of a braking system for stopping the vehicle. Braking device 40 includes foot brake 41 which imparts a resistance force to wheels 9, retarder 42 which applies a resistance force to propulsion shaft 6, and an exhaust brake 43 which applies a load to the engine.

Further, vehicle 1 has automatic traveling device 2 as a configuration of a control system for controlling travel of vehicle 1. Automatic traveling device 2 is a device for causing vehicle 1 to perform an automatic traveling (constant velocity traveling or coasting) by controlling the output of engine 3, the disengagement of clutch 4 and the shift of transmission 5, and includes a plurality of control devices.

Specifically, automatic traveling device 2 includes engine ECU (engine control device) 10, power transmission ECU (power transmission control device) 11, target vehicle velocity setting device 13, increase/decrease value setting device 14, road information acquisition device 20, vehicle information acquisition device 30, and travel control device 100.

Engine ECU 10, power transmission ECU 11 and travel control device 100 are connected to each other by an on-vehicle network, so that necessary data and control signals can be transmitted to and received from each other.

Engine ECU 10 controls the output of engine 3. Power transmission ECU 11 controls the disengagement of clutch 4 and the shift of transmission 5.

Target vehicle velocity setting device 13 sets target vehicle velocity V (see FIG. 3 and FIG. 4) during the constant velocity traveling of vehicle 1 to travel control device 100.

Increase/decrease value setting device 14 sets velocity decrease value −V1 and velocity increase value +V1 at the constant velocity traveling of vehicle 1 in travel control device 100. These values V, −V1 and +V1 are parameters used for automatic travel of vehicle 1.

Target vehicle velocity setting device 13 and increase/decrease value setting device 14 include, for example, an information input interface such as a display with a touch panel disposed on a dashboard (not illustrated) of a driver's seat, and receive the setting of the parameters from the driver. Target vehicle velocity V, velocity decrease value −V1, and velocity increase value +V1 are referred to as "setting information" as appropriate.

When vehicle 1 is likely to depart from the traveling lane (the traveling lane indicating the boundary of the road on which vehicle 1 is traveling), output device 15 outputs an alarm for notifying the driver of the likelihood of lane departure (hereinafter simply referred to as an alarm) under the control of travel control device 100 (lane departure warning section 140 illustrated in FIG. 2). Output device 15 may include, for example, a display, a speaker, or both.

Road information acquisition device 20 acquires road information indicating the road condition and the current position of vehicle 1, and outputs the road information to travel control device 100. For example, road information acquisition device 20 includes current position acquisition device 21 which is a receiver of a satellite positioning system (GPS), weather acquisition device 22 which acquires weather during traveling, ambient sensor 23 which detects a distance to a vehicle traveling around vehicle 1 (such as a preceding vehicle and a parallel traveling vehicle) and a vehicle velocity difference, and imaging device 24 (for example, a CCD camera) which captures the surroundings of vehicle 1.

Figure 2:
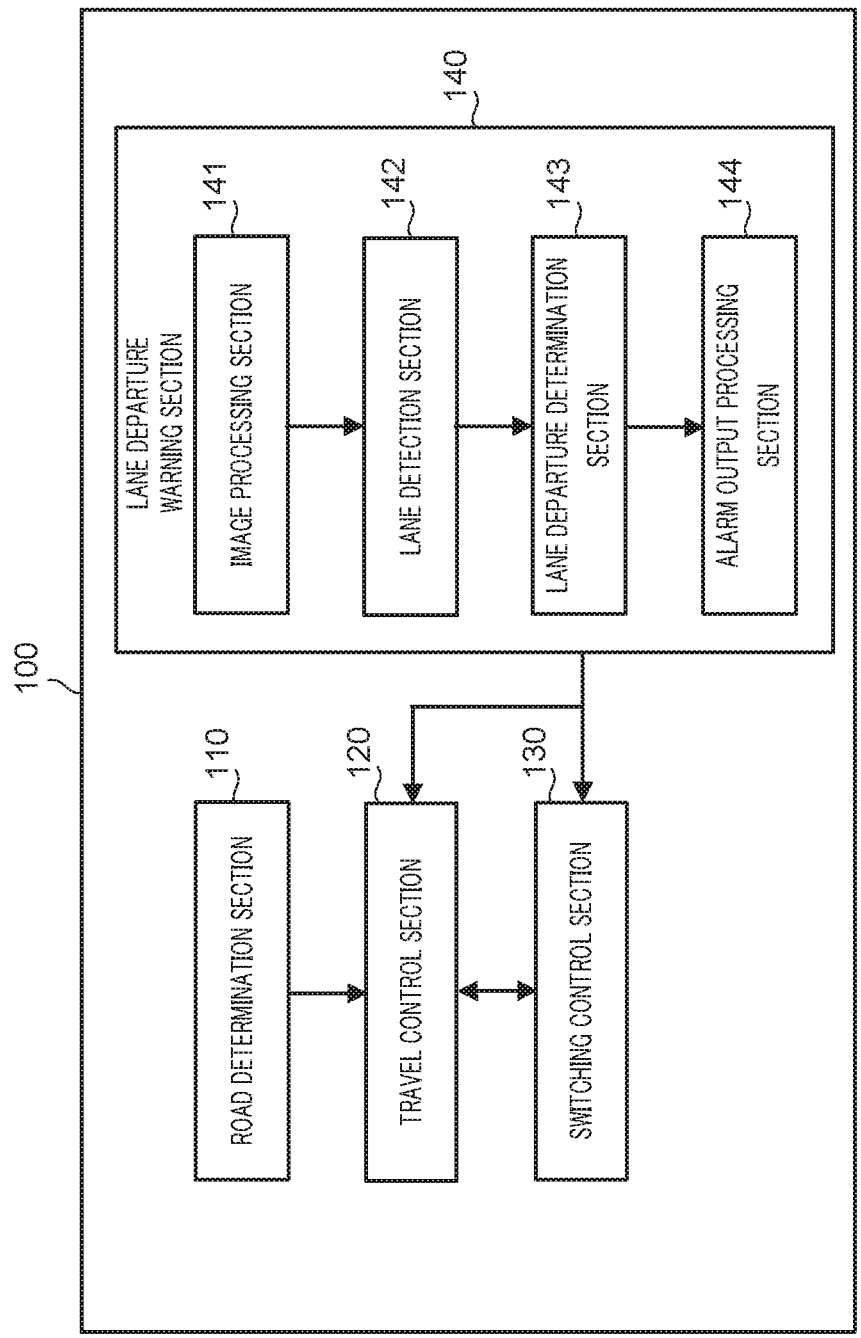
FIG. 2 is a block diagram illustrating an example of a configuration of a travel control device according to an embodiment of this disclosure.

It is preferable that the road information includes road gradient information indicating the gradient of each point of the road, in consideration of the traveling schedule generated by travel control device 100 (travel control section 120 in FIG. 2). The road gradient information is data describing the altitude (road altitude) of the corresponding positions in association with the horizontal positions (latitude/longitude information or the like) of each road.

Vehicle information acquisition device 30 acquires vehicle information indicating the operation contents of the driver and the state of vehicle 1 and outputs the vehicle information to travel control device 100. For example, vehicle information acquisition device 30 includes: accelerator sensor 31 configured to detect a depression amount of an accelerator pedal; brake switch 32 for detecting whether or not a brake pedal is depressed; shift lever 33; turn signal switch 34; and vehicle velocity sensor 35 for detecting the velocity of vehicle 1.

Travel control device 100 generates a traveling schedule including constant velocity traveling and N coasting based on the setting information, road information, and vehicle information described above.

Then, travel control device 100 controls each part of vehicle 1 so that vehicle 1 travels in accordance with the generated traveling schedule.

Travel control device 100 detects a traveling lane of a road on which vehicle 1 is traveling based on an image photographed by imaging device 24. It is determined whether or not vehicle 1 is likely to depart from the traveling lane. When there is likelihood of lane departure, an alarm is outputted from an output device 15. This function is realized by lane departure warning section 140 (refer to FIG. 2) which will be described later.

Although not illustrated, engine ECU 10, power transmission ECU 11, and travel control device 100 include, for example, a Central Processing Unit (CPU), a storage medium such as a Read Only Memory (ROM) storing a control program, a working memory such as a Random Access Memory (RAM), and a communication circuit, respectively. In this case, for example, the function of each part (refer to FIG. 2) constituting travel control device 100 is realized by the CPU executing the control program. Note that all or part of engine ECU 10, power transmission ECU 11, and travel control device 100 may be integrally formed.

<Configuration Example of Travel Control Device 100>

Next, the configuration of travel control device 100 will be described with reference to FIG. 2. FIG. 2 is a block diagram showing an example of the configuration of travel control device 100.

As illustrated in FIG. 2, travel control device 100 includes road determination section 110, travel control section 120, switching control section 130, and lane departure warning section 140. The respective parts will be described below.

First, lane departure warning section 140 will be described.

Lane departure warning section 140 includes image processing section 141, lane detection section 142, lane departure determination section 143, and alarm output processing section 144.

Image processing section 141 receives a captured image (an image obtained by photographing the surroundings of vehicle 1) from imaging device 24, and performs image processing such as edge extraction on the captured image.

Lane detection section 142 detects a traveling lane from the image subjected to the image processing by image processing section 141.

Lane departure determination section 143 determines whether or not vehicle 1 is likely to depart from the traveling lane. When it is determined that vehicle 1 is likely to depart from the traveling lane, lane departure determination section 143 notifies alarm output processing section 144, travel control section 120, and switching control section 130 of the determination.

When it is determined that vehicle 1 is likely to depart from the traveling lane by lane departure determination section 143, alarm output processing section 25 outputs an alarm from output device 15. The output of the alarm may be, for example, a warning message display or an alarm sound (which may be a warning message).

Next, road determination section 110 will be described.

Based on the road information, road determination section 110 determines whether or not road on which vehicle 1 travels is a predetermined road, and outputs the determination result information indicating the result of the determination to travel control section 120. The predetermined road is a road on which vehicle 1 can be N coasting, and is, for example, a road including a downhill.

The predetermined road includes a first road including a downhill such that vehicle 1 is accelerated, and a second road including a downhill such that vehicle 1 is decelerated. An example of the first road is illustrated in FIG. 3, and an example of the second road is illustrated in FIG. 4.

Figure 3:
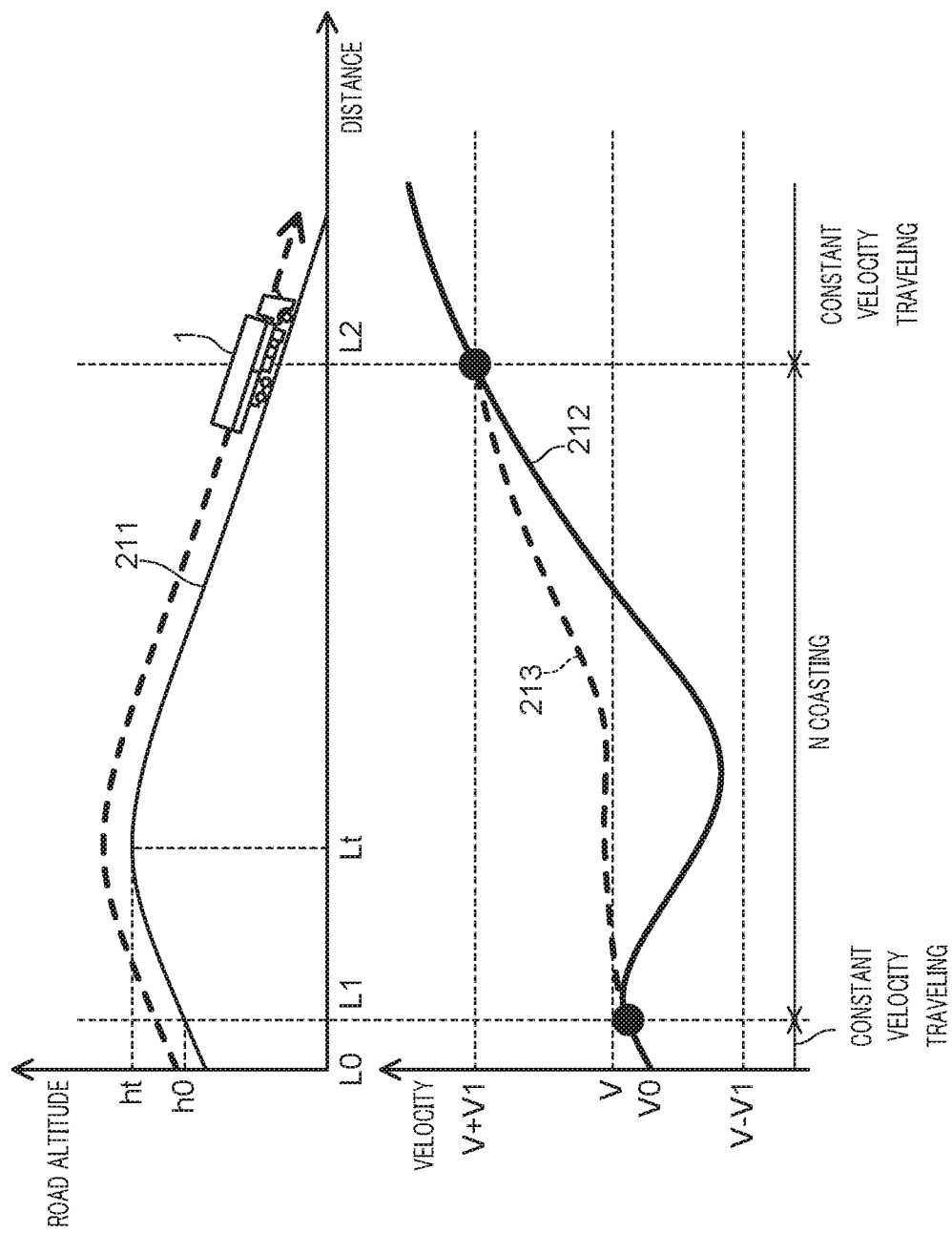
FIG. 3 is a diagram illustrating an example of road gradient information and a traveling schedule on a first road.
Figure 4:
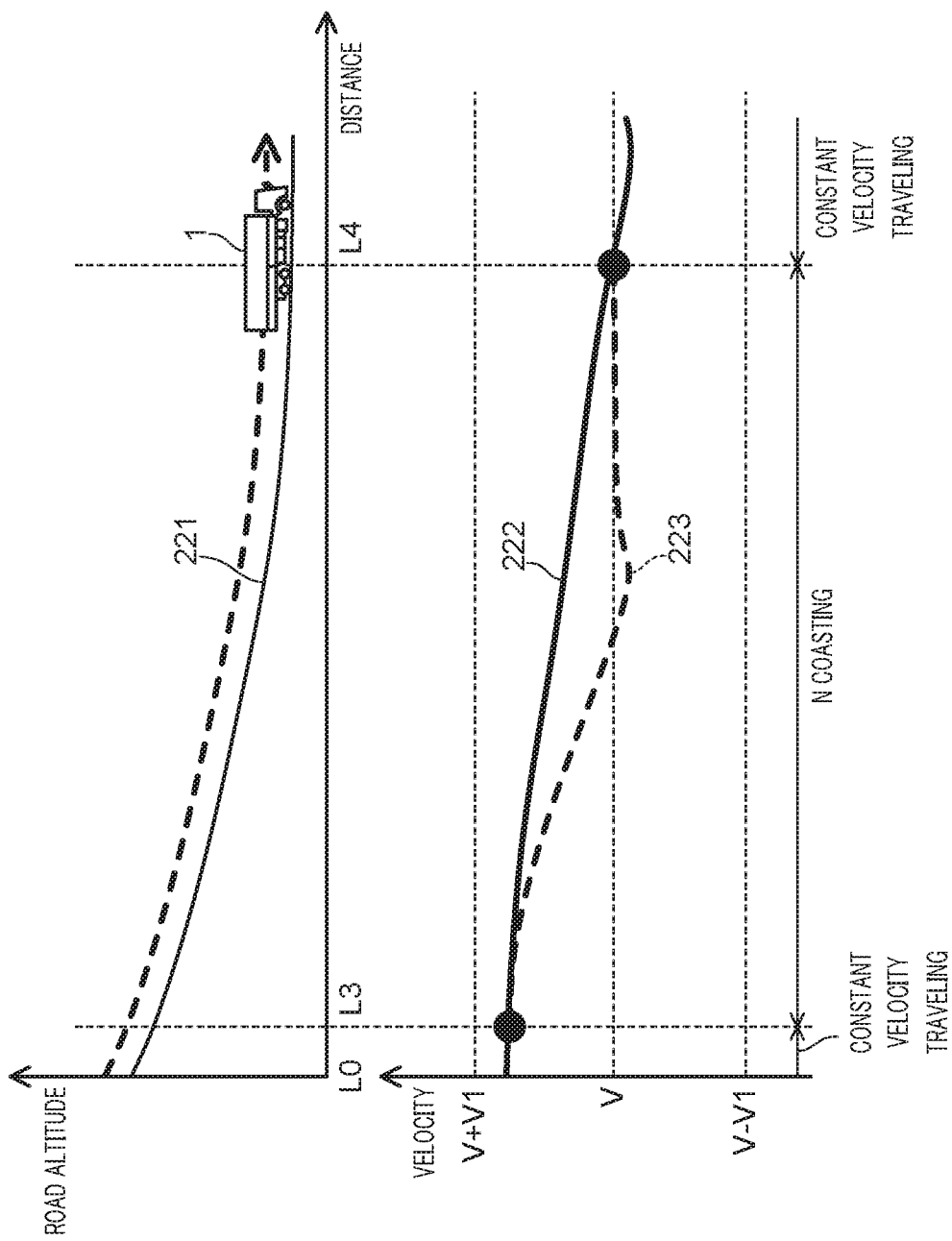
FIG. 4 is a diagram illustrating an example of road gradient information and a traveling schedule on a second road.

First road 211 illustrated in FIG. 3 is a road including a downhill such that gradient resistance Fs of the slope is smaller than the sum of air resistance Fa for vehicle 1 and rolling resistance Fr for vehicle 1.

In the case where vehicle 1 is N coasting during the period from position L1 to position L2 on first road 211, as indicated by solid line 212 in FIG. 3, vehicle 1 travels while gradually increasing the velocity in a downhill portion (between position Lt and position L2).

In this way, when vehicle 1 is N coasting from position L1 to position L2, fuel is not injected during the N coasting, so that fuel consumption can be improved. On the other hand, when vehicle 1 travels at constant velocity from position L1 to position L2 (see broken line 213), fuel continues to be injected during the constant velocity traveling.

Second road 221 illustrated in FIG. 4 is a road including a gentle downhill such that gradient resistance Fs becomes larger than the sum of air resistance Fa and rolling resistance Fr.

In the case of second road 221, vehicle 1 is decelerated even when the vehicle is downhill. Therefore, as illustrated in FIG. 4, when the velocity of vehicle 1 becomes equal to or lower than maximum velocity V+V1 in a velocity higher than maximum velocity V+V1 in the predetermined range (when vehicle 1 reaches position L3), vehicle 1 starts the N coasting.

When vehicle 1 travels at constant velocity between position L3 and position L4 in FIG. 4, the velocity of vehicle 1 is controlled to match target vehicle velocity V, so that the deceleration amount in time becomes relatively large (refer to broken line 223). On the other hand, when vehicle 1 is N coasting from position L3 to position L4 in FIG. 4, the velocity of vehicle 1 gradually decreases due to inertia force, so that the temporal deceleration amount of vehicle 1 can be reduced more than that at the time of constant velocity traveling (see solid line 222). Therefore, the time until the velocity of vehicle 1 departs from a predetermined range can be prolonged, so that the fuel can be saved correspondingly.

The predetermined range described above is a range of a velocity set based on target vehicle velocity V, and is set such that the maximum velocity is V+V1 and the minimum velocity is V−V1, for example, based on the setting information described above. That is, from the V+V1 (first velocity) larger than target vehicle velocity V to V+V1 (second velocity) smaller than target vehicle velocity V is set as a predetermined range. The setting of the predetermined range is performed by travel control section 120.

Road determination section 110 has been described above. In the present embodiment, road determination section 110 is included in travel control device 100, but road determination section 110 may be provided outside travel control device 100 (including the outside of vehicle 1).

Next, travel control section 120 will be described.

Travel control section 120 recognizes whether or not the road is a predetermined road on the basis of the determination result information from road determination section 110.

Further, travel control section 120 generates a traveling schedule including a constant velocity traveling and an N coasting, and drives vehicle 1 according to the generated traveling schedule based on the current position of vehicle 1.

For example, at the time of constant velocity traveling, travel control section 120 controls the fuel injection amount of engine 3 via power transmission ECU 11 to thereby realize traveling at a velocity according to the traveling schedule. For example, when the vehicle is N coasting, travel control section 120 disconnects clutch 4 via power transmission ECU 11. Further, for example, travel control section 120 controls the respective parts of braking device 40 to stop vehicle 1. The details of the traveling schedule will be described later with reference to FIGS. 3 and 4.

In addition, travel control section 120 performs control to switch the traveling state of vehicle 1 to either the constant velocity traveling or the N coasting in the generated traveling schedule. In other words, travel control section 120 executes either constant velocity traveling control or N coasting control based on the generated traveling schedule.

Specifically, when the road on which vehicle 1 travels is a predetermined road and the velocity of vehicle 1 acquired from vehicle velocity sensor 35 is within a predetermined range (for example, the range of V−V1 to V+V1 illustrated in FIG. 3 and FIG. 4) (that is, when the N coasting starting condition is satisfied), travel control section 120 switches from the constant velocity traveling control to the N coasting control. Thus, vehicle 1 is switched from the constant velocity traveling to the N coasting.

On the other hand, when the velocity of vehicle 1 falls outside the predetermined range during N coasting, travel control section 120 switches from the N coasting control to the constant velocity traveling control. At this time, travel control section 120 controls the vehicle velocity of vehicle 1 which is outside the predetermined range to be restored to target vehicle velocity V. Thus, vehicle 1 is switched from the N coasting to the constant velocity traveling.

In this manner, travel control section 120 of the present embodiment can switch and execute the constant velocity traveling control and the N coasting control.

Further, travel control section 120 outputs the traveling mode information indicating either the constant velocity traveling control or the N coasting control is being executed (in other words, whether vehicle 1 is traveling at constant velocity or during N coasting) appropriately to switching control section 130.

Further, when travel control section 120 receives the instruction information (details will be described later) from switching control section 130 under the N coasting control or the constant velocity traveling control, travel control section 120 is controlled based on the instruction information. Details will be described later.

Travel control section 120 has been described above.

Next, a description will be given of switching control section 130. Hereinafter, the operation of travel control section 120 controlled by switching control section 130 will be described.

Switching control section 130 recognizes which of the constant velocity traveling control and the N coasting control is being executed based on the traveling mode information from travel control section 120.

When lane departure determination section 143 determines that vehicle 1 is likely to depart from the traveling lane under the N coasting control or the constant velocity traveling control, switching control section 130 outputs the instruction information to travel control section 120. The instruction information is information indicating an instruction to prohibit the execution of the N coasting control for a predetermined time. The predetermined time is a time required for the brake to operate.

First, a case where travel control section 120 receives instruction information under the N coasting control will be described.

In this case, based on the instruction information, travel control section 120 stops the execution of the N coasting control until the predetermined time elapses from the time when it is determined that vehicle 1 is likely to depart from the traveling lane, and executes the constant velocity traveling control. As a result, the brake (braking device 40) is enabled to operate.

If the N coasting starting condition is satisfied when the predetermined time has elapsed, travel control section 120 switches from the constant velocity traveling control to the N coasting control. On the other hand, if the N coasting starting condition is not satisfied when the predetermined time has elapsed, travel control section 120 continues the traveling of the constant velocity traveling control.

Next, a description will be given of a case where travel control section 120 receives instruction information under constant velocity traveling control.

In this case, travel control section 120 does not switch to the N coasting control even if the N coasting starting condition is satisfied until the predetermined time elapses from the point in time when it is determined that vehicle 1 is likely to depart from the traveling lane based on the instruction information. Therefore, travel control section 120 continues execution of constant velocity traveling control during the predetermined time period. As a result, the brake (braking device 40) is continuously operated.

If the N coasting starting condition is satisfied when the predetermined time has elapsed, travel control section 120 switches from the constant velocity traveling control to the N coasting control. On the other hand, if the N coasting starting condition is not satisfied when the predetermined time has elapsed, travel control section 120 continues the traveling of the constant velocity traveling control.

Switching control section 130 has been described above.

<Example of a Traveling Schedule>

Next, an example of a traveling schedule used by travel control section 120 will be described in detail with reference to FIG. 3 and FIG. 4. FIG. 3 is a diagram illustrating an example of road gradient information and a traveling schedule on a first road. FIG. 4 is a diagram illustrating an example of road gradient information and a traveling schedule on a second road.

For example, travel control section 120 sequentially generates a traveling schedule corresponding to a predetermined length of time from the current time or a predetermined travel distance from the current position of vehicle 1 at regular intervals.

First, an example of a traveling schedule on the first road including a downhill such that vehicle 1 is increased in velocity will be described.

Such a traveling schedule is generated, for example, so that the moving average velocity is the target vehicle velocity V, the allowable maximum velocity in the N coasting is Vmax=V+V1 or less, and the traveling condition that the allowable minimum velocity in the N coasting is equal to or larger than Vmin=V−V1 is satisfied.

Travel control section 120 generates a traveling schedule for actively performing the N coasting on the basis of the road gradient information. Further, on condition that the velocity of vehicle 1 is equal to or higher than the allowable minimum velocity Vmin at the top position where the road turns from the uphill side to the downhill side, travel control section 120 creates a traveling schedule including the contents to switch from the constant velocity traveling to the N coasting before the top position.

As illustrated in FIG. 3, the road gradient information includes, for example, information indicating the road altitude for each horizontal distance (route) from current position L0 of vehicle 1, as indicated by solid line 211 in FIG.

3. It is also possible to replace the horizontal distance from current position L0 of vehicle 1 with the elapsed time from the current time. Further, the road altitude may be replaced with a road gradient based on the relationship between the road altitude and the front and rear road altitudes. The road gradient information of solid line 211 indicates that current position L0 of vehicle 1 is on the uphill side, and that a downhill slope is present immediately after the uphill slope.

For example, based on the road gradient information, travel control section 120 sequentially determines whether or not there is a portion (the top of the slope) that turns from the uphill side to the downhill side within a predetermined distance in front of the road.

When the top of the slope is present, travel control section 120 determines whether or not the vehicle travels over the top of the hill while the vehicle is kept at the N coasting, when the vehicle is switched to the N coasting at position L1 immediately after current position L0. That is, travel control section 120 calculates whether or not the velocity at the top of the slope is equal to or higher than allowable minimum velocity Vmin. Travel control section 120 performs such calculation based on current velocity V0, the traveling resistance coefficient of vehicle 1 obtained in advance by experiment or the like, and road gradient information.

When the vehicle is switched to the N coasting on the uphill side, the velocity of vehicle 1 is abruptly reduced. However, in the case where the velocity is high or the distance to the top is short enough to maintain the velocity at which a velocity equal to or higher than (V−V1), which corresponds to the allowable minimum velocity Vmin at a position getting into the downhill, it is possible to satisfy the aforementioned traveling condition in which the minimum velocity in the N coasting is equal to or greater than the minimum allowable velocity Vmin even if the vehicle is switched to the N coasting on the uphill.

When it is determined that the vehicle can travel over the top of the hill in a state of the N coasting, travel control section 120, for example, switches to the N coasting at the immediately following position L1, and determines that the N coasting is maintained at position L2 at which the velocity departs from the range from allowable minimum velocity Vmin to allowable maximum velocity Vmax, that is, from (V−V1) to (V+V1). Then, as indicated by solid line 212 in the lower side of FIG. 3, travel control section 120 creates a traveling schedule having a content in which traveling is switched to the N coasting at position L1, and the N coasting is maintained to position L2.

Specifically, travel control section 120 calculates an estimated value (hereinafter referred to as "top estimation vehicle velocity") Vt of the velocity at top position Lt when vehicle 1 performs the N coasting to top position Lt by using the following expression (1), for example.

[Expression 1]

$$Vt = \sqrt{\frac{2}{M}\left\{\frac{1}{2}MV0^2 + Mgh0 - \left(Mght + \lambda \cdot V0^2 \cdot g \cdot \frac{\Delta x}{\cos\theta} + \mu \cdot Mg \cdot \Delta x\right)\right\}} \quad (1)$$

Here, M is the current vehicle weight of vehicle 1, g is gravity acceleration, h0 is the altitude of current position L0 of vehicle 1, ht is the altitude of top position Lt, μ, is the rolling resistance coefficient of vehicle 1, Δx is the distance in the horizontal direction from current position L0 to top position Lt (route), θ is the average gradient of a portion where vehicle 1 performs the N coasting, and V0 is a velocity of vehicle 1.

When calculated top estimated vehicle velocity Vt is equal to or higher than the set allowable minimum velocity Vmin, travel control section 120 maintains the vehicle as is when the vehicle is during N coasting and determines to switch the vehicle to the N coasting state when the vehicle is traveling at the constant velocity. That is, travel control section 120 creates a traveling schedule as indicated by solid line 212 in FIG. 3, for example, and controls vehicle 1 according to the traveling schedule.

The traveling schedule including the interval of the N coasting determined based on the road gradient information effectively improves the fuel efficiency of vehicle 1. Further, by traveling vehicle 1 according to the traveling schedule, it is not necessary for the driver to perform a sequential accelerator operation.

As described above, an example of a traveling schedule on the first road has been described.

Next, a description will be given of a traveling schedule on the second road including a downhill on which vehicle 1 is decelerated.

Such a traveling schedule is generated, for example, so that the allowable maximum velocity in the N coasting is equal to or less than Vmax=V+V1, and that the allowable minimum velocity in the N coasting is equal to or greater than Vmin=V.

Based on road information, travel control section 120 creates a traveling schedule including the content of switching traveling from the constant velocity traveling to the N coasting after the road has changed from a steep downhill to a gentle downhill, on condition that the velocity is equal to or lower than the permissible maximum velocity Vmax and equal to or higher than the allowable minimum velocity Vmin.

As illustrated in FIG. 4, the road gradient information includes, for example, information indicating the road altitude for each horizontal distance (route) from current position L0 of vehicle 1, as indicated by solid line 221 on the upper side in FIG. 4. The road gradient information of solid line 221 indicates that current position L0 of vehicle 1 is on the middle of the steep downhill, and position L3 is a portion changing from the steep downhill downward to the gentle downhill.

Based on the road gradient information, travel control section 120 sequentially determines whether or not there is a portion that turns from a steep downhill to a gentle downhill within a predetermined distance range in front of the road. When that part is present, travel control section 120 determines whether or not the velocity is within the range from V+V1 to V in a portion changing to the gentle downhill or after changing to a gentle downhill. When the velocity is within this range, travel control section 120 switches from the constant velocity traveling to the N coasting at position L3 of changing from the steep downhill to a gentle downhill, or after position L3 where the velocity becomes equal to or lower than V+V1 (see the solid line 222).

As indicated by solid line 222 in FIG. 4, travel control section 120 creates a traveling schedule having a content in which the N coasting is maintained from position L3 to position L4 at which the allowable minimum velocity V is achieved after the switching to the N coasting.

As a result, the velocity of vehicle 1 is decelerated, but when compared with the velocity at the constant velocity traveling, since the deceleration amount is small, the time until the velocity reaches V, which is the minimum velocity, becomes longer correspondingly. That is, since the time of the N coasting can be prolonged, the fuel efficiency between the N coasting times is improved.

As described above, an example of a traveling schedule on the second road has been described.

<Operation Example of Travel Control Device 100>

Figure 5:
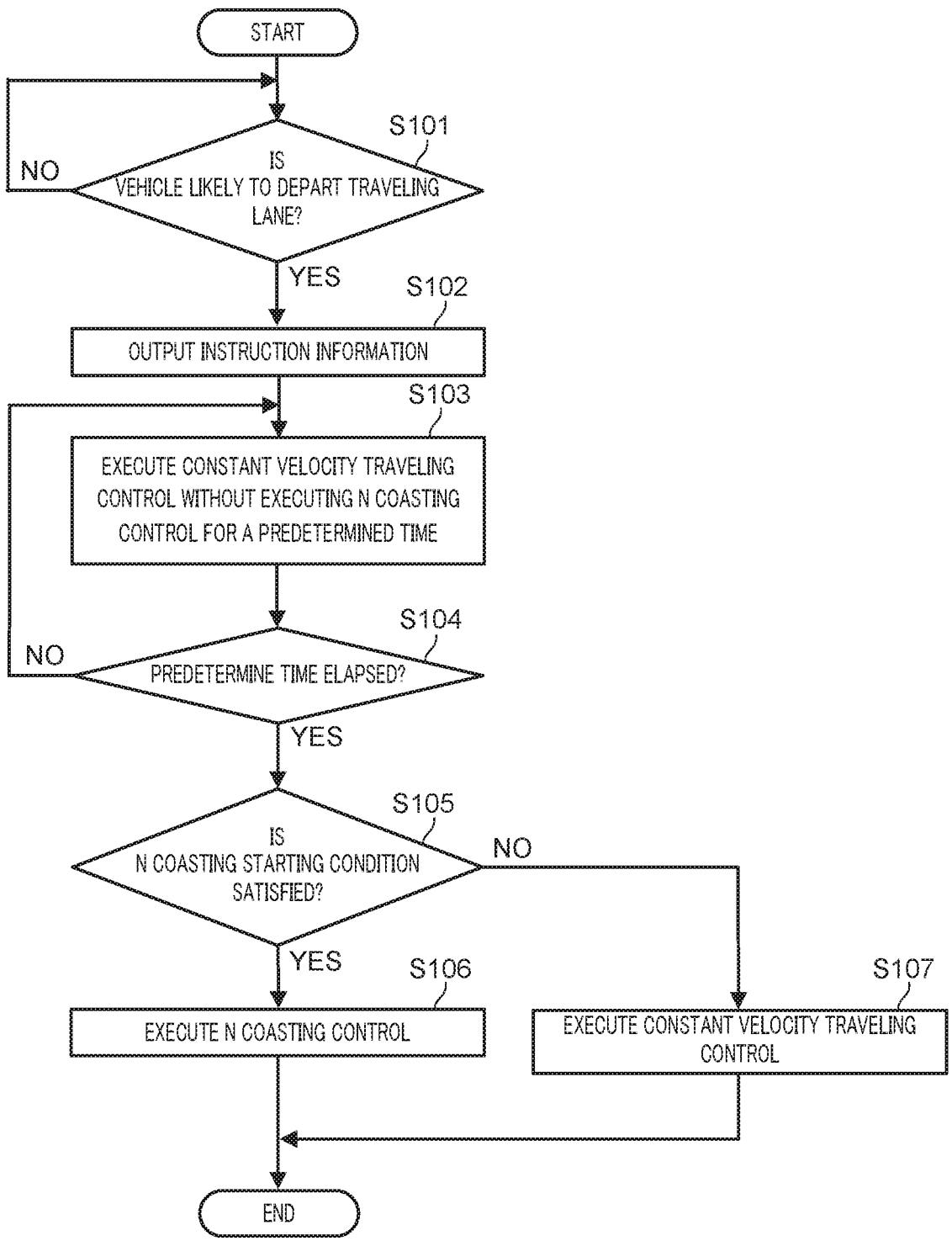
FIG. 5 is a flowchart illustrating an example of the operation of the travel control device according to the embodiment of this disclosure.

Next, the operation of travel control device 100 (operation for controlling the traveling of vehicle 1, which is also referred to as a travel control operation hereinafter) will be described. FIG. 5 is a flowchart illustrating an example of the operation of travel control device 100. The flow illustrated in FIG. 5 is performed, for example, during traveling of vehicle 1 at a constant velocity or during N coasting of vehicle 1. The flow illustrated in FIG. 5 is repeatedly carried out during traveling of vehicle 1.

First, lane departure determination section 143 determines whether or not vehicle 1 is likely to depart from the traveling lane (hereinafter, referred to as likelihood of lane departure) (step S101).

If there is no likelihood of lane departure (step S101: NO) as a result of the determination in step S101, the process returns to step S101. In this case, switching control section 130 does not output the instruction information to travel control section 120.

On the other hand, when there is likelihood of lane departure (step S101: YES) as a result of the determination in step S101, the process proceeds to step S102.

Next, switching control section 130 outputs the instruction information to travel control section 120 (step S102). Travel control section 120 receives the instruction information.

Next, based on the instruction information, travel control section 120 does not execute the N coasting control but executes the constant velocity traveling control for a predetermined time from a time point when lane departure determination section 143 determines that there is likelihood of the lane departure (step S103).

For example, when travel control section 120 receives the instruction information under the N coasting control, travel control section 120 stops the N coasting control and executes the constant velocity traveling control for a predetermined time period. As a result, braking device 40 of vehicle 1 is enabled to operate.

For example, when the instruction information is received under the constant velocity traveling control, travel control section 120 does not execute the N coasting control for a predetermined time and continues the constant velocity traveling control even if the N coasting starting condition is satisfied. Accordingly, braking device 40 of vehicle 1 continues to operate.

The control in step S103 is performed until a predetermined time has elapsed. That is, when the predetermined time has not elapsed (step S104: NO), the process returns to step S103. On the other hand, when the predetermined time has elapsed (step S104: YES), the process proceeds to step S105.

Next, travel control section 120 determines whether the N coasting starting condition is satisfied (step S105). For example, when the road on which vehicle 1 travels is a predetermined road and the velocity of vehicle 1 is within a predetermined range, travel control section 120 determines that the N coasting starting condition is satisfied.

When the N coasting starting condition is satisfied as a result of the determination in step S105 (step S105: YES), travel control section 120 executes the N coasting control (step S106). Thus, vehicle 1 starts the N coasting.

In contrast, when the N coasting starting condition is not satisfied as a result of the determination in step S105 (step S105: NO), travel control section 120 executes (continues) the constant velocity traveling control (step S107). Thus, vehicle 1 executes (continues) constant velocity traveling.

An example of the operation of travel control device 100 has been described above.

As described in detail thus far, the present embodiment is characterized in that in the case where vehicle 1 is likely to depart from the traveling lane during N coasting or during traveling at a constant velocity, the constant velocity traveling control is executed without executing the N coasting control.

Therefore, the present embodiment is capable of solving the problem that the N coasting is continued when vehicle 1 is likely to depart from the traveling lane during N coasting, and thus braking device 40 is not operated. In addition, the present embodiment is capable of solving the problem that when vehicle 1 is likely to depart from the traveling lane during traveling at a constant velocity, the N coasting starting condition is satisfied and thus the N coasting is started, and as a result, braking device 40 is not operated. Therefore, according to the present embodiment, safety can be secured when vehicle 1 is likely to depart from the traveling lane during N coasting or during traveling at a constant velocity.

(Variations)

It should be noted that the above embodiment is merely an example of the implementation of this disclosure, and is not intended to limit the scope of this disclosure. That is, this disclosure may be embodied in various forms without departing from the spirit or essential characteristics thereof. Hereinafter, each variation will be described.

(Variation 1)

In the embodiment, a case where lane departure warning section 140 determines whether or not vehicle 1 is likely to depart from the traveling lane, and if there is likelihood of departure, output device 15 is caused to output an alarm has been described as an example. However, the present invention is not limited thereto. For example, lane departure warning section 140 may determine whether or not vehicle 1 has departed from the traveling lane, and if departed, output an alarm to output device 15. In this case, switching control section 130 may output instruction information to travel control section 120 when lane departure warning section 140 (lane departure determination section 143) has determined that vehicle 1 has departed from the travel lane.

(Variation 2)

In the embodiment, a case where lane departure warning section 140 is included in travel control device 100 has been described as an example, but lane departure warning section 140 may be provided outside travel control device 100.

(Variation 3)

In the embodiment, switching control section 130 controls travel control section 120 to execute constant velocity traveling control without executing coasting control until a predetermined time elapses from a point in time when it is determined that vehicle 1 is likely to depart from the traveling lane, but this disclosure is not limited thereto. For example, switching control section 130 may control travel control section 120 to execute constant velocity traveling control without executing coasting control until a predetermined time elapses from the time when an alarm is output.

<Summary of Disclosure>

The travel control device of this disclosure includes a travel control section that switches between constant velocity traveling control for causing a vehicle to travel at a target vehicle velocity and coasting control for allowing the vehicle to travel by inertia, and a switching control section that controls the travel control section to execute the constant velocity traveling control without executing the coasting control when the vehicle is likely to depart from the traveling lane under the constant velocity traveling control or the coasting control.

In the travel control device, the switching control section may control the travel control section to execute the constant velocity traveling control without executing the coasting control until a predetermined time elapses from a point at which it is determined that the vehicle is likely to depart from the traveling lane or a point at which an alarm for notifying the likelihood of departure from the traveling lane is output.

In the travel control device, the travel control section may determine whether or not the coasting starting condition is satisfied when the predetermined time elapses, and if the starting condition for coasting is satisfied, terminates the constant velocity traveling control and starts execution of the coasting control, and if the starting condition is not satisfied, may continue execution of the constant velocity traveling control when the starting condition for coasting is not satisfied.

In the travel control device, the travel control section may determine that the starting condition of the coasting is satisfied when the road on which the vehicle travels is a predetermined road on which the vehicle is allowed to travel by inertia, and the velocity of the vehicle is within a predetermined range.

The travel control device may further include a road determination section that determines whether or not the road is the predetermined road.

The travel control device may further include: an image processing section that performs image processing on a captured image of surroundings of the vehicle; a lane detection section that detects a traveling lane from the image subjected to the image processing; a lane departure determination section that determines whether or not the vehicle is likely to depart from the traveling lane; and an alarm output processing section that causes a predetermined output device to output an alarm for notifying the likelihood of departure from the traveling lane when the lane departure determination section determines that the vehicle is likely to depart from the traveling lane.

The vehicle of this disclosure includes a travel control device of this disclosure.

The travel control method of this disclosure is a travel control method of a travel control device that switches between a constant velocity traveling control for causing a vehicle to travel at a target vehicle velocity and a coasting control for allowing the vehicle to travel by inertia to be executed, including executing the constant velocity traveling control without executing the coasting control when the vehicle is likely to depart from the traveling lane under the constant velocity traveling control or the coasting control.

This application is based on Japanese Patent Application No. 2017-056555, filed on Mar. 22, 2017, the contents of which are incorporated herein by reference.

INDUSTRIAL APPLICABILITY

This disclosure is useful for a travel control device for controlling the travel of a vehicle, a vehicle, and a travel control method.

REFERENCE SIGNS LIST 1 vehicle
2 automatic traveling device
3 engine
4 clutch
5 transmission
6 propulsion shaft
7 differential device
8 drive shaft
9 wheel
10 engine ECU
11 power transmission ECU
13 target vehicle velocity setting device
14 increase/decrease value setting device
15 output device
20 road information acquisition device
21 current position acquisition device
22 weather acquisition device
23 ambient sensor
24 imaging device
30 vehicle information acquisition device
31 accelerator sensor
32 brake switch
33 shift lever
34 turn signal switch
35 vehicle velocity sensor
40 braking device
41 foot brake
42 retarder
43 exhaust brake
100 travel control device
110 road determination section
120 travel control section
130 switching control section
140 lane departure warning section
141 image processing section
142 lane detection section
143 lane departure determination section
144 alarm output processing section

What is claimed is:

1. A travel control device, comprising:
a travel control circuitry that switches between a constant velocity traveling control for causing a vehicle to travel at a target vehicle velocity and a coasting control for allowing the vehicle to travel by inertia in a state where a clutch is disengaged and an engine is disconnected from wheels, switching from the constant velocity traveling control to the coasting control being performed when the velocity of vehicle is within a predetermined range, and
a switching control circuitry that controls the travel control circuitry to execute continuing the constant velocity traveling control without executing the coasting control even when the velocity of vehicle is within the predetermined range, when the vehicle approaches within a predetermined distance to a boundary of a traveling lane under the constant velocity traveling control, and execute switching to the constant velocity traveling control without executing the coasting control even when the velocity of vehicle is within the predetermined range, when the vehicle approaches within the predetermined distance to the boundary of the traveling lane under the coasting control.

2. The travel control device according to claim 1, wherein the switching control circuitry controls the travel control circuitry to execute the constant velocity traveling control without executing the coasting control even when the velocity of vehicle is within the predetermined range until a predetermined time elapses from a point at which it is determined that the vehicle approaches within the predetermined distance to the boundary of the traveling lane or a point at which an alarm for notification of approaching within the predetermined distance to the boundary of the traveling lane is output.

3. The travel control device according to claim 2, wherein the travel control circuitry determines whether or not a starting condition of the coasting is satisfied when the predetermined time has elapsed, when the starting condition of the coasting is satisfied, the travel control circuitry terminates the constant velocity traveling control and starts execution of the coasting control, and when the starting condition of the coasting is not satisfied, the travel control circuitry continues to execute the constant velocity traveling control.

4. The travel control device according to claim 3, wherein the travel control circuitry determines that the starting condition of the coasting is satisfied when the road on which the vehicle travels is a predetermined road on which the vehicle is allowed to travel by inertia, and a velocity of the vehicle is within a predetermined range.

5. The travel control device according to claim 4, further comprising a road determination circuitry that determines whether or not the road is the predetermined road.

6. The travel control device according to claim 1, further comprising:

an image processing circuitry that performs image processing on a captured image of surroundings of the vehicle;

a lane detection circuitry that detects the boundary of the traveling lane from the image subjected to the image processing;

a lane departure determination circuitry that determines whether or not the vehicle approaches within the predetermined distance to the boundary of is likely to depart from the traveling lane; and an alarm output processing circuitry that, when the lane departure determination circuitry determines that the vehicle approaches the predetermined distance to the boundary of is likely to depart from the traveling lane, causes a predetermined output device to output an alarm to notify the approach of the predetermined distance to the boundary of the traveling lane.

7. A vehicle, comprising:

a travel control device comprises a travel control circuitry that switches between a constant velocity traveling control for causing a vehicle to travel at a target vehicle velocity and a coasting control for allowing the vehicle to travel by inertia in a state where a clutch is disengaged and an engine is disconnected from wheels, switching from the constant velocity traveling control to the coasting control being performed when the velocity of vehicle is within a predetermined range, and a switching control circuitry that controls the travel control circuitry to execute continuing the constant velocity traveling control without executing the coasting control even when the velocity of vehicle is within the predetermined range, when the vehicle approaches within a predetermined distance to a boundary of a traveling lane under the constant velocity traveling control, and execute switching to the constant velocity traveling control without executing the coasting control even when the velocity of vehicle is within the predetermined range, when the vehicle approaches within the predetermined distance to the boundary of the traveling lane under the coasting control.

8. A travel control method performed by a travel control device that switches between a constant velocity traveling control for causing a vehicle to travel at a target vehicle velocity and a coasting control for allowing the vehicle to travel by inertia in a state where a clutch is disengaged and an engine is disconnected from wheels, switching from the constant velocity traveling control to the coasting control being performed when the velocity of vehicle is within a predetermined range, the method comprising:

executing continuing the constant velocity traveling control without executing the coasting control even when the velocity of vehicle is within the predetermined range, when the vehicle approaches within a predetermined distance to a boundary of the traveling lane under the constant velocity traveling control, and executing switching to the constant velocity traveling control without executing the coasting control even when the velocity of vehicle is within the predetermined range, when the vehicle approaches within the predetermined distance to the boundary of the traveling lane under the coasting control.

9. The travel control device according to claim 1, wherein the travel control circuitry switches from the coasting control to the constant velocity traveling control when the velocity of vehicle is outside the predetermined range.

10. The travel control device according to claim 1, wherein the predetermined range is set from a first velocity greater than the target vehicle velocity to a second velocity less than the target vehicle velocity.

11. The travel control device according to claim 1, wherein the travel control circuitry generates a driving schedule that includes a constant velocity traveling and a coasting based on road information, and switches between the constant velocity traveling control and the coasting control based on the driving schedule.

\* \* \* \* \*